United States Patent
Cipriano (10) Patent No.: US 10,297,100 B1
(45) Date of Patent: *May 21, 2019

(54) IDENTIFICATION VERIFICATION SYSTEM

(71) Applicant: Intellicheck Mobilisa, Inc., Jericho, NY (US)

(72) Inventor: Joseph J. Cipriano, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/636,406

(22) Filed: Jun. 28, 2017

Related U.S. Application Data (63) Continuation of application No. 15/005,253, filed on Jan. 25, 2016, now Pat. No. 9,697,667, which is a continuation of application No. 14/011,166, filed on Aug. 27, 2013, now Pat. No. 9,245,157, which is a continuation of application No. 13/334,184, filed on
(Continued)

(51) Int. Cl.
| | |
|---|---|
| *G07F 7/08* | (2006.01) |
| *G06K 7/08* | (2006.01) |
| *H04L 29/06* | (2006.01) |
| *G07F 7/12* | (2006.01) |
| *H04W 4/50* | (2018.01) |
| *G06F 16/2455* | (2019.01) |

(52) U.S. Cl.
CPC ........ *G07F 7/0873* (2013.01); *G06F 16/2455* (2019.01); *G06K 7/089* (2013.01); *G07F 7/122* (2013.01); *H04L 63/123* (2013.01); *H04W 4/50* (2018.02)

(58) Field of Classification Search
CPC ........ G06F 17/00; G07F 19/00; G06Q 40/00; G07D 11/00; G06K 5/00; G06K 7/08; G06K 7/10; G06K 9/22; G06K 19/00; G06K 19/06

USPC .. 235/375, 379–380, 449, 454, 472.01, 493, 235/487, 462.45, 462.46, 492; 705/26, 64
See application file for complete search history.

(56) References Cited

U.S. PATENT DOCUMENTS

| | | | |
|---|---|---|---|
| 3,569,619 | A | 3/1971 | Simjian et al. |
| 3,636,318 | A | 1/1972 | Lindstrom et al. |
| (Continued) | | | |

FOREIGN PATENT DOCUMENTS

| | | |
|---|---|---|
| DE | 2802430 A1 | 7/1978 |
| DE | 3050473 C2 | 9/1986 |
| (Continued) | | |

OTHER PUBLICATIONS

"Natural Language Understanding Through Fuzzy Logic Interference and Its Application to Speech Recognition" (2002) Jiping Sun, Fakhri Karray, Otman Basir & Mohamed Kamel.
(Continued)

*Primary Examiner* — Edwyn Labaze
(74) *Attorney, Agent, or Firm* — Ruttler Mills, PLLC; James J. Ruttler (57) ABSTRACT

A method and apparatus is provided for verifying the validity of ID cards. A card reading device reads an ID card and transmits a request to a database server. A database is queried and a reply is sent back to the card reading device indicating whether the ID is valid. If desired, the reply can include additional information, such as a description of the ID holder. The ID verification system can be used to help verify whether an ID belongs to the ID holder. The system can also log and timestamp events for future access.

20 Claims, 2 Drawing Sheets

Related U.S. Application Data

Dec. 22, 2011, now Pat. No. 8,517,254, which is a continuation of application No. 12/769,606, filed on Apr. 28, 2010, now Pat. No. 8,083,130, which is a continuation of application No. 10/440,058, filed on May 16, 2003, now Pat. No. 7,708,189.

(60) Provisional application No. 60/381,361, filed on May 17, 2002.

(56) References Cited

U.S. PATENT DOCUMENTS

| | | |
|---|---|---|
| 3,702,392 A | 11/1972 | St. Jean |
| 3,868,057 A | 2/1975 | Chavez |
| 3,906,201 A | 9/1975 | Housman et al. |
| 3,956,615 A | 5/1976 | Anderson et al. |
| 3,988,570 A | 10/1976 | Murphy et al. |
| 4,138,057 A | 2/1979 | Atalla |
| 4,180,207 A | 12/1979 | Lee |
| 4,186,871 A | 2/1980 | Anderson et al. |
| 4,193,131 A | 3/1980 | Lennon et al. |
| RE30,579 E | 4/1981 | Goldman et al. |
| 4,304,961 A | 12/1981 | Campbell, Jr. |
| 4,357,529 A | 11/1982 | Atalla |
| 4,369,361 A | 1/1983 | Swartz et al. |
| 4,450,348 A | 5/1984 | Stockburger et al. |
| 4,453,074 A | 6/1984 | Weinstein |
| 4,471,216 A | 9/1984 | Nerve |
| 4,506,148 A | 3/1985 | Berthold et al. |
| 4,575,816 A | 3/1986 | Hendrickson et al. |
| 4,629,872 A | 12/1986 | Hallberg |
| 4,634,846 A | 1/1987 | Harvey et al. |
| 4,639,889 A | 1/1987 | Matsumoto et al. |
| 4,656,473 A | 4/1987 | Goldman et al. |
| 4,659,914 A | 4/1987 | Kondo et al. |
| 4,689,477 A | 8/1987 | Goldman |
| 4,752,676 A | 6/1988 | Leonard et al. |
| 4,807,287 A | 2/1989 | Tucker et al. |
| 4,811,393 A | 3/1989 | Hazard |
| 4,811,408 A | 3/1989 | Goldman |
| 4,812,628 A | 3/1989 | Boston et al. |
| 4,816,655 A | 3/1989 | Musyck et al. |
| 4,816,657 A | 3/1989 | Stockburger et al. |
| 4,879,747 A | 11/1989 | Leighton |
| 4,906,988 A | 3/1990 | Copella |
| 4,972,476 A | 11/1990 | Nathans |
| 4,981,370 A | 1/1991 | Dziewit et al. |
| 4,982,072 A | 1/1991 | Takigami |
| 4,993,068 A | 2/1991 | Piosenka et al. |
| 4,995,081 A | 2/1991 | Leighton et al. |
| 5,001,752 A | 3/1991 | Fischer |
| 5,007,089 A | 4/1991 | Matyas et al. |
| 5,012,077 A | 4/1991 | Takano |
| 5,016,192 A | 5/1991 | Ishido et al. |
| 5,030,117 A | 7/1991 | Delorme |
| 5,054,077 A | 10/1991 | Suzuki |
| 5,055,658 A | 10/1991 | Cockburn |
| 5,136,643 A | 8/1992 | Fischer |
| 5,140,634 A | 8/1992 | Guillon et al. |
| 5,163,098 A | 11/1992 | Dabhura |
| 5,172,785 A | 12/1992 | Takahashi |
| 5,199,074 A | 3/1993 | Thor |
| 5,214,699 A | 5/1993 | Monroe et al. |
| 5,222,152 A | 6/1993 | Fishbine et al. |
| 5,237,611 A | 8/1993 | Rasmussen et al. |
| 5,241,600 A | 8/1993 | Hillis |
| 5,249,227 A | 9/1993 | Bergum et al. |
| 5,259,025 A | 11/1993 | Monroe et al. |
| 5,267,315 A | 11/1993 | Narita et al. |
| 5,280,527 A | 1/1994 | Gullman et al. |
| 5,284,364 A | 2/1994 | Jain |
| 5,287,181 A | 2/1994 | Holman |
| 5,321,751 A | 6/1994 | Ray et al. |
| 5,336,871 A | 8/1994 | Colgate, Jr. |
| 5,337,358 A | 8/1994 | Axelrod |
| 5,337,361 A | 8/1994 | Wang et al. |
| 5,341,428 A | 8/1994 | Schatz |
| 5,347,589 A | 9/1994 | Meeks et al. |
| 5,367,148 A | 11/1994 | Storch et al. |
| 5,367,581 A | 11/1994 | Abel |
| 5,420,924 A | 5/1995 | Berson et al. |
| 5,422,468 A | 6/1995 | Abecassis |
| 5,429,361 A | 7/1995 | Raven et al. |
| 5,432,864 A | 7/1995 | Lu et al. |
| 5,446,273 A | 8/1995 | Leslie |
| 5,446,885 A | 8/1995 | Moore |
| 5,453,600 A | 9/1995 | Swartz |
| 5,461,217 A | 10/1995 | Claus |
| 5,469,506 A | 11/1995 | Berson et al. |
| 5,471,533 A | 11/1995 | Wang et al. |
| 5,475,585 A | 12/1995 | Bush |
| 5,490,217 A | 2/1996 | Wang et al. |
| 5,500,518 A | 3/1996 | Olzak et al. |
| 5,506,395 A | 4/1996 | Eppley |
| 5,513,019 A | 4/1996 | Cueli |
| 5,513,261 A | 4/1996 | Maher |
| 5,513,272 A | 4/1996 | Bogosian, Jr. |
| 5,514,860 A | 5/1996 | Berson |
| 5,546,278 A | 8/1996 | Bethurum |
| 5,553,143 A | 9/1996 | Ross |
| 5,559,885 A | 9/1996 | Drexler et al. |
| 5,590,193 A | 12/1996 | Le Roux |
| 5,594,226 A | 1/1997 | Steger |
| 5,594,806 A | 1/1997 | Colbert |
| 5,598,474 A | 1/1997 | Johnson |
| 5,610,993 A | 3/1997 | Yamamoto |
| 5,621,200 A | 4/1997 | Irwin, Jr. et al. |
| 5,630,127 A | 5/1997 | Moore |
| 5,635,981 A | 6/1997 | Ribacoff |
| 5,642,485 A | 6/1997 | Deaton |
| 5,651,066 A | 7/1997 | Moriyasu et al. |
| 5,661,805 A | 8/1997 | Miyauchi |
| 5,663,553 A | 9/1997 | Aucsmith |
| 5,668,874 A | 9/1997 | Kristol et al. |
| 5,679,940 A | 10/1997 | Templeton et al. |
| 5,694,471 A | 12/1997 | Chen et al. |
| 5,695,835 A | 12/1997 | Weber et al. |
| 5,706,507 A | 1/1998 | Schloss |
| 5,712,472 A | 1/1998 | Lee |
| 5,717,776 A | 2/1998 | Watanabe |
| 5,719,939 A | 2/1998 | Tel |
| 5,721,777 A | 2/1998 | Blaze |
| 5,722,526 A | 3/1998 | Sharrard |
| 5,742,685 A | 4/1998 | Berson et al. |
| D393,950 S | 5/1998 | Lockhart |
| 5,748,908 A | 5/1998 | Yu |
| 5,754,939 A | 5/1998 | Herz et al. |
| 5,770,084 A | 6/1998 | Novis et al. |
| 5,770,849 A | 6/1998 | Novis et al. |
| 5,781,650 A | 7/1998 | Lobo et al. |
| 5,786,587 A | 7/1998 | Colgate, Jr. |
| 5,805,849 A | 9/1998 | Jordan et al. |
| 5,812,664 A | 9/1998 | Bemobitch et al. |
| 5,838,812 A | 11/1998 | Pare et al. |
| 5,848,426 A | 12/1998 | Wang et al. |
| 5,862,247 A | 1/1999 | Fisun et al. |
| 5,864,622 A | 1/1999 | Marcus |
| 5,864,623 A | 1/1999 | Messina et al. |
| 5,870,723 A | 2/1999 | Pare, Jr. et al. |
| 5,966,654 A | 10/1999 | Croughwell et al. |
| 5,988,497 A | 11/1999 | Wallace |
| 5,991,429 A | 11/1999 | Coffin et al. |
| 5,995,014 A | 11/1999 | DiMaria |
| 6,038,666 A | 3/2000 | Hsu et al. |
| 6,070,147 A | 5/2000 | Harms |
| 6,075,455 A | 6/2000 | DiMaria et al. |
| 6,089,452 A | 7/2000 | Rhode, III |
| 6,104,809 A | 8/2000 | Berson et al. |
| 6,119,932 A | 9/2000 | Maloney et al. |
| 6,119,933 A | 9/2000 | Wong et al. |
| 6,135,355 A | 10/2000 | Han et al. |
| 6,138,914 A | 10/2000 | Campo et al. |
| 6,148,091 A | 11/2000 | DiMaria |
| 6,169,542 B1 | 1/2001 | Hooks et al. |

(56) References Cited

U.S. PATENT DOCUMENTS

| | | |
|---|---|---|
| 6,171,138 B1 | 1/2001 | Lefebvre et al. |
| 6,182,221 B1 | 1/2001 | Hsu et al. |
| 6,196,460 B1 | 3/2001 | Shin |
| 6,199,079 B1 | 3/2001 | Gupta et al. |
| 6,202,055 B1 | 3/2001 | Houvener et al. |
| 6,222,463 B1 | 4/2001 | Rai |
| 6,224,109 B1 | 5/2001 | Yang |
| 6,234,389 B1 | 5/2001 | Valliani et al. |
| 6,263,447 B1 | 7/2001 | French et al. |
| 6,289,113 B1 | 9/2001 | McHugh et al. |
| 6,317,544 B1 | 11/2001 | Diehl et al. |
| 6,354,506 B1 | 3/2002 | Plan et al. |
| 6,363,387 B1 | 3/2002 | Ponnekanti et al. |
| 6,386,451 B1 | 5/2002 | Sehr |
| 6,442,532 B1 | 8/2002 | Kawan |
| 6,460,185 B1 | 10/2002 | Hardy |
| 6,463,416 B1 | 10/2002 | Messina |
| 6,475,146 B1 | 11/2002 | Frelburger et al. |
| 6,484,260 B1 | 11/2002 | Scott et al. |
| 6,499,141 B1 | 12/2002 | Egnew |
| 6,523,741 B1 | 2/2003 | DiMaria et al. |
| 6,542,635 B1 | 4/2003 | Hu et al. |
| 6,557,752 B1 | 5/2003 | Yacoob |
| 6,564,997 B1 | 5/2003 | Juds |
| 6,565,000 B2 | 5/2003 | Sehr |
| 6,587,032 B2 | 7/2003 | Armingaud |
| 6,592,029 B2 | 7/2003 | Brikho |
| 6,609,659 B2 | 8/2003 | Sehr |
| 6,612,958 B2 | 9/2003 | Imai et al. |
| 6,615,263 B2 | 9/2003 | Dulai et al. |
| 6,624,739 B1 | 9/2003 | Stobbe |
| 6,651,217 B1 | 11/2003 | Kennedy et al. |
| 6,679,425 B1 | 1/2004 | Sheppard et al. |
| 6,736,317 B1 | 5/2004 | McDonald et al. |
| 6,736,322 B2 | 5/2004 | Gobburu et al. |
| 6,745,937 B2 | 6/2004 | Walsh et al. |
| 6,754,910 B2 | 6/2004 | Shultz et al. |
| 6,758,394 B2 | 7/2004 | Maskatiya et al. |
| 6,760,463 B2 | 7/2004 | Rhoads |
| 6,779,721 B2 | 8/2004 | Larson et al. |
| 6,785,405 B2 | 8/2004 | Tuttle et al. |
| 6,808,109 B2 | 10/2004 | Page |
| 6,820,984 B2 | 11/2004 | Furuhata |
| 6,854,642 B2 | 2/2005 | Metcalf et al. |
| 6,910,223 B2 | 6/2005 | Egnew |
| 6,914,517 B2 | 7/2005 | Kinsella |
| 6,920,437 B2 | 7/2005 | Messina |
| 6,928,546 B1 | 8/2005 | Nanavati et al. |
| 6,934,861 B2 | 8/2005 | Haala |
| 6,944,782 B2 | 9/2005 | von Mueller et al. |
| 6,956,615 B2 | 10/2005 | Nakagishi et al. |
| 6,970,088 B2 | 11/2005 | Kovach |
| 6,991,159 B2 | 1/2006 | Zenou |
| 7,003,669 B2 | 2/2006 | Monk |
| 7,027,931 B1 | 4/2006 | Jones et al. |
| 7,035,626 B1 | 4/2006 | Luciano, Jr. |
| 7,059,516 B2 | 6/2006 | Matsuyama et al. |
| 7,072,081 B2 | 7/2006 | Johnson et al. |
| 7,110,573 B2 | 9/2006 | Monk et al. |
| 7,117,228 B2 | 10/2006 | Tomita et al. |
| 7,118,033 B2 | 10/2006 | Merkert |
| 7,119,553 B2 | 10/2006 | Yang et al. |
| 7,119,674 B2 | 10/2006 | Sefton |
| 7,147,155 B2 | 12/2006 | Weekes |
| 7,161,465 B2 | 1/2007 | Wood et al. |
| 7,185,808 B2 | 3/2007 | Mitsumoto |
| 7,212,113 B2 | 5/2007 | Zanovitch |
| 7,212,279 B1 | 5/2007 | Feng |
| 7,244,043 B2 | 7/2007 | Monk et al. |
| 7,277,891 B2 | 10/2007 | Howard et al. |
| 7,280,030 B1 | 10/2007 | Monaco |
| 7,284,698 B2 | 10/2007 | Sogo |
| 7,299,408 B1 | 11/2007 | Daconta et al. |
| 7,309,010 B2 | 12/2007 | Stopperan et al. |
| 7,309,012 B2 | 12/2007 | von Mueller et al. |
| 7,313,825 B2 | 12/2007 | Redlich et al. |
| 7,349,987 B2 | 3/2008 | Redlich et al. |
| 7,362,210 B2 | 4/2008 | Bazakos et al. |
| 7,382,261 B2 | 6/2008 | Lin et al. |
| 7,382,911 B1 | 6/2008 | Meier et al. |
| 7,392,944 B2 | 7/2008 | Shieh |
| 7,466,223 B2 | 12/2008 | Sefton |
| 7,478,067 B2 | 1/2009 | Messina |
| 7,484,088 B2 | 1/2009 | Campbell et al. |
| 7,492,256 B2 | 2/2009 | Eren et al. |
| 7,494,060 B2 | 2/2009 | Zagami |
| 7,500,178 B1 | 3/2009 | O'Donnell |
| 7,526,645 B2 | 4/2009 | Miyazaki et al. |
| 7,554,446 B2 | 6/2009 | Ciarcia et al. |
| 7,568,108 B2 | 7/2009 | Monaco et al. |
| 7,587,368 B2 | 9/2009 | Felsher |
| 7,599,847 B2 | 10/2009 | Block et al. |
| 7,631,805 B2 | 12/2009 | Larson et al. |
| 7,639,846 B2 | 12/2009 | Yoda |
| 7,685,629 B1 | 3/2010 | White et al. |
| 7,708,189 B1 | 5/2010 | Cipriano |
| 7,716,240 B2 | 5/2010 | Lim |
| 7,739,744 B2 | 6/2010 | Burch et al. |
| 7,802,305 B1 | 9/2010 | Leeds |
| 7,817,013 B2 | 10/2010 | Bazakos et al. |
| 7,821,391 B2 | 10/2010 | Gupta et al. |
| 7,844,545 B2 | 11/2010 | Michelsen |
| 7,860,318 B2 | 12/2010 | Mandelbaum et al. |
| 7,895,611 B2 | 2/2011 | Grabarnik et al. |
| 7,898,385 B2 | 3/2011 | Kocher |
| 7,899,751 B2 | 3/2011 | Messina |
| 7,925,887 B2 | 4/2011 | Burton |
| 8,009,013 B1 | 8/2011 | Hirschfeld et al. |
| 8,019,691 B2 | 9/2011 | Dominguez et al. |
| 8,023,140 B2 | 9/2011 | Lapstun et al. |
| 8,036,431 B1 | 10/2011 | Fisher et al. |
| 8,083,130 B1 | 12/2011 | Cipriano |
| 8,086,525 B2 | 12/2011 | Atwood et al. |
| 8,090,388 B1 | 1/2012 | Opitz |
| 8,139,869 B2 | 3/2012 | Mandelbaum et al. |
| 8,220,047 B1 | 7/2012 | Soghoian et al. |
| 8,235,287 B2 | 8/2012 | McKelvey |
| 8,286,875 B2 | 10/2012 | Tang et al. |
| 8,294,554 B2 | 10/2012 | Shoarinejad et al. |
| 8,322,605 B2 | 12/2012 | Ludlow et al. |
| 8,517,254 B1 | 8/2013 | Cipriano |
| 8,520,957 B2 | 8/2013 | Mandelbaum et al. |
| 8,616,446 B2 | 12/2013 | Ludlow et al. |
| 8,771,085 B1 | 7/2014 | Clyde et al. |
| 8,960,541 B2 | 2/2015 | Ludlow |
| 8,964,211 B2 | 2/2015 | Koga |
| 9,069,982 B2 | 6/2015 | Coles et al. |
| 9,245,157 B1 | 1/2016 | Cipriano |
| 9,697,667 B1 | 7/2017 | Cipriano |
| 2001/0027439 A1 | 10/2001 | Holtzman et al. |
| 2001/0034222 A1* | 10/2001 | Roustaei ............ H04N 1/00281 455/403 |
| 2001/0041581 A1 | 11/2001 | Hansson |
| 2002/0001393 A1 | 1/2002 | Jones et al. |
| 2002/0002507 A1 | 1/2002 | Hatakeyama |
| 2002/0010679 A1 | 1/2002 | Felsher |
| 2002/0025796 A1 | 2/2002 | Taylor et al. |
| 2002/0046185 A1 | 4/2002 | Villart et al. |
| 2002/0052193 A1* | 5/2002 | Chetty .................... G06F 21/35 455/412.1 |
| 2002/0056747 A1 | 5/2002 | Matsuyama et al. |
| 2002/0087478 A1 | 7/2002 | Hudd et al. |
| 2002/0089410 A1* | 7/2002 | Janiak .................... G06F 1/1632 340/5.53 |
| 2002/0095389 A1 | 7/2002 | Gaines |
| 2002/0100802 A1 | 8/2002 | Behr |
| 2002/0100803 A1 | 8/2002 | Behr |
| 2002/0134837 A1* | 9/2002 | Kishon .................. G06K 7/084 235/449 |
| 2002/0143571 A1 | 10/2002 | Messina |
| 2002/0156676 A1 | 10/2002 | Ahrens et al. |
| 2003/0048904 A1 | 3/2003 | Wang et al. |
| 2003/0055689 A1 | 3/2003 | Block et al. |
| 2003/0057276 A1 | 3/2003 | Appalucci et al. |

(56) References Cited

U.S. PATENT DOCUMENTS

| | | |
|---|---|---|
| 2003/0070077 A1 | 4/2003 | Redlich et al. |
| 2003/0071730 A1 | 4/2003 | Valbh |
| 2003/0078069 A1 | 4/2003 | Lindeman |
| 2003/0099379 A1 | 5/2003 | Monk et al. |
| 2003/0115459 A1 | 6/2003 | Monk |
| 2003/0126092 A1 | 7/2003 | Chihara |
| 2003/0143990 A1 | 7/2003 | Minear et al. |
| 2003/0154138 A1 | 8/2003 | Phillips et al. |
| 2003/0177102 A1 | 9/2003 | Robinson |
| 2003/0182435 A1 | 9/2003 | Redlich et al. |
| 2003/0218066 A1* | 11/2003 | Fernandes ............ G06K 7/084 235/449 |
| 2003/0225687 A1 | 12/2003 | Lawrence |
| 2004/0002894 A1 | 1/2004 | Kocher |
| 2004/0010472 A1 | 1/2004 | Hilby et al. |
| 2004/0034666 A1 | 2/2004 | Chen |
| 2004/0049401 A1 | 3/2004 | Carr et al. |
| 2004/0059688 A1 | 3/2004 | Dominguez et al. |
| 2004/0068693 A1 | 4/2004 | Rawat et al. |
| 2004/0078335 A1 | 4/2004 | Calvesio et al. |
| 2004/0080504 A1 | 4/2004 | Salesky |
| 2004/0081332 A1 | 4/2004 | Tuttle et al. |
| 2004/0083091 A1 | 4/2004 | Ie et al. |
| 2004/0104268 A1 | 6/2004 | Bailey |
| 2004/0117060 A1 | 6/2004 | Stopperan et al. |
| 2004/0117624 A1 | 6/2004 | Brandt et al. |
| 2004/0124982 A1 | 7/2004 | Kovach |
| 2004/0153408 A1 | 8/2004 | Jones et al. |
| 2004/0205466 A1 | 10/2004 | Kuppinger et al. |
| 2004/0215557 A1 | 10/2004 | Michelsen |
| 2004/0233036 A1 | 11/2004 | Sefton |
| 2004/0250142 A1 | 12/2004 | Feyler |
| 2004/0254895 A1 | 12/2004 | Kumagaya et al. |
| 2005/0039014 A1 | 2/2005 | Sajkowsky |
| 2005/0076013 A1 | 4/2005 | Hilbert |
| 2005/0080649 A1 | 4/2005 | Alvarez et al. |
| 2005/0082365 A1 | 4/2005 | Merkert |
| 2005/0093675 A1 | 5/2005 | Wood et al. |
| 2005/0131829 A1 | 6/2005 | Messina |
| 2005/0137987 A1 | 6/2005 | May et al. |
| 2005/0171787 A1 | 8/2005 | Zagami |
| 2005/0187677 A1 | 8/2005 | Walker |
| 2005/0205668 A1 | 9/2005 | Sogo |
| 2005/0209955 A1 | 9/2005 | Underwood et al. |
| 2005/0212654 A1 | 9/2005 | Yoda |
| 2005/0216953 A1 | 9/2005 | Ellingson |
| 2005/0241003 A1 | 10/2005 | Sweeney et al. |
| 2005/0242172 A1 | 11/2005 | Murata |
| 2005/0247787 A1 | 11/2005 | Von Mueller et al. |
| 2005/0248450 A1 | 11/2005 | Zanovitch |
| 2005/0258234 A1 | 11/2005 | Silverbrook et al. |
| 2005/0273453 A1 | 12/2005 | Holloran |
| 2005/0284931 A1 | 12/2005 | Adams et al. |
| 2006/0004812 A1 | 1/2006 | Blackwell et al. |
| 2006/0049255 A1* | 3/2006 | von Mueller .......... G06F 21/72 235/449 |
| 2006/0075228 A1 | 4/2006 | Black et al. |
| 2006/0080541 A1 | 4/2006 | Monaco et al. |
| 2006/0102717 A1 | 5/2006 | Wood et al. |
| 2006/0151607 A1 | 7/2006 | Horikiri et al. |
| 2006/0157559 A1 | 7/2006 | Levy et al. |
| 2006/0176062 A1 | 8/2006 | Yang et al. |
| 2006/0184575 A1 | 8/2006 | Singleton |
| 2006/0186994 A1 | 8/2006 | Lin et al. |
| 2006/0231610 A1 | 10/2006 | Cheng |
| 2006/0237529 A1 | 10/2006 | Kelley et al. |
| 2006/0243799 A1 | 11/2006 | Kelly et al. |
| 2007/0046424 A1 | 3/2007 | Davis et al. |
| 2007/0069921 A1 | 3/2007 | Sefton |
| 2007/0085684 A1 | 4/2007 | Ciarcia et al. |
| 2007/0094594 A1 | 4/2007 | Matichuk et al. |
| 2007/0121937 A1* | 5/2007 | Kochevar ............ G06Q 10/06 380/30 |
| 2007/0152841 A1 | 7/2007 | Eren et al. |
| 2007/0156659 A1 | 7/2007 | Lim |
| 2007/0183000 A1 | 8/2007 | Eisen et al. |
| 2007/0226014 A1 | 9/2007 | Alemayehu et al. |
| 2007/0254676 A1 | 11/2007 | Pedigo et al. |
| 2007/0275735 A1 | 11/2007 | Estevez |
| 2008/0002911 A1 | 1/2008 | Eisen et al. |
| 2008/0011850 A1 | 1/2008 | Henry |
| 2008/0041942 A1* | 2/2008 | Aissa ................ G06K 9/00087 235/382 |
| 2008/0109099 A1 | 5/2008 | Moshier |
| 2008/0143482 A1 | 6/2008 | Shoarinejad et al. |
| 2008/0148059 A1* | 6/2008 | Shapiro .................. G06F 21/32 713/186 |
| 2008/0239365 A1 | 10/2008 | Salgado et al. |
| 2008/0272881 A1 | 11/2008 | Goel |
| 2008/0307503 A1 | 12/2008 | Waters |
| 2009/0085745 A1 | 4/2009 | Gupta et al. |
| 2009/0089206 A1 | 4/2009 | Lukac |
| 2009/0121897 A1 | 5/2009 | Muhlethaler et al. |
| 2009/0144619 A1 | 6/2009 | Best et al. |
| 2009/0150442 A1 | 6/2009 | Barnard et al. |
| 2009/0289443 A1 | 11/2009 | Okezie |
| 2009/0296166 A1 | 12/2009 | Schrichte |
| 2009/0321517 A1 | 12/2009 | Deane et al. |
| 2010/0033753 A1 | 2/2010 | Stephenson |
| 2010/0046015 A1 | 2/2010 | Whittle et al. |
| 2010/0070396 A1 | 3/2010 | Schrichte |
| 2010/0123003 A1* | 5/2010 | Olson ................ G06Q 20/355 235/380 |
| 2010/0241844 A1 | 9/2010 | Hussain et al. |
| 2011/0001604 A1 | 1/2011 | Ludlow et al. |
| 2011/0142295 A1 | 6/2011 | Mandelbaum et al. |
| 2011/0145053 A1 | 6/2011 | Hashim-Waris |
| 2011/0221565 A1 | 9/2011 | Ludlow et al. |
| 2012/0024948 A1 | 2/2012 | Messina |
| 2012/0117045 A1 | 5/2012 | Carlock |
| 2012/0330838 A1 | 12/2012 | Hoffman et al. |
| 2013/0024239 A1 | 1/2013 | Baker et al. |
| 2013/0040657 A1 | 2/2013 | Jackson |
| 2013/0185240 A1 | 7/2013 | Ward et al. |
| 2013/0214044 A1 | 8/2013 | Sperduti et al. |
| 2014/0056486 A1 | 2/2014 | Mandelbaum et al. |
| 2014/0059188 A1 | 2/2014 | Linden et al. |
| 2014/0115710 A1 | 4/2014 | Hughes et al. |
| 2015/0012305 A1 | 1/2015 | Truskovsky et al. |
| 2015/0200922 A1 | 7/2015 | Eschbach et al. |
| 2016/0125680 A1 | 5/2016 | White et al. |
| 2016/0358171 A1 | 12/2016 | Gannon |
| 2017/0126784 A1 | 5/2017 | Mattern |

FOREIGN PATENT DOCUMENTS

| | | |
|---|---|---|
| DE | 4410459 A1 | 2/1995 |
| DE | 19527737 | 6/2006 |
| EP | 0187448 A2 | 7/1986 |
| EP | 0407207 A3 | 7/1991 |
| EP | 0683471 A1 | 11/1995 |
| EP | 0991027 A2 | 4/2000 |
| FR | 2571873 A1 | 4/1986 |
| GB | 1546053 | 1/1978 |
| GB | 2067322 | 10/1984 |
| GB | 2136180 B | 2/1985 |
| GB | 2270586 A | 3/1994 |
| GB | 2332973 A | 7/1999 |
| GB | 2359172 B | 2/2004 |
| JP | 0050075879 | 6/1975 |
| JP | 63138462 | 6/1988 |
| JP | 64055695 | 3/1989 |
| JP | 7093648 | 4/1995 |
| JP | 0080101868 | 4/1996 |
| JP | 09245231 | 9/1997 |
| JP | 11316818 | 11/1999 |
| JP | 3100972 B2 | 10/2000 |
| JP | 2003157615 A | 5/2003 |
| WO | WO8702491 A1 | 4/1987 |
| WO | WO9412372 | 6/1994 |

(56) References Cited

FOREIGN PATENT DOCUMENTS

| WO | WO9422371 A2 | 10/1994 |
| WO | 0213049 A1 | 2/2002 |
| WO | WO02095589 A1 | 11/2002 |

OTHER PUBLICATIONS

*Honeywell International Inc. v. Intellicheck Mobilisa, Inc*, PTAB-CBM2017-00062, CBM review of patent owned by common assignee, initiated Jul. 28, 2017, documents filed Jul. 28, 2017.
*Honeywell International Inc. v. Intellicheck Mobilisa, Inc*, PTAB-CBM2017-00062, CBM review of patent owned by common assignee, initiated Jul. 28, 2017, documents filed Aug. 14, 2017 through Aug. 31, 2017.
*Honeywell International Inc. v. Intellicheck Mobilisa, Inc*, PTAB-CBM2017-00062, CBM review of patent owned by common assignee, initiated Jul. 28, 2017, documents filed Oct. 18, 2018.
*Honeywell International Inc. v. Intellicheck Mobilisa, Inc*, PTAB-CBM2017-00062, CBM review of patent owned by common assignee, initiated Jul. 28, 2017, documents filed Oct. 27, 2017.
*Honeywell International Inc. v. Intellicheck Mobilisa, Inc*, PTAB-CBM2017-00062, CBM review of patent owned by common assignee, initiated Jul. 28, 2017, documents filed Oct. 30, 2017.
International Search Report and Written Opinion for International Application No. PCT/US08/74119; Applicant Mobilisa, Inc.; dated Jan. 2, 209 (12 pages).
Kim et al. 'Experiences with Tripwire: Using Integrity Checkers for Intrusion Detection', In Systems Administration. Networking and Security Conference III (Usenix, 1994 [online]). Published Feb. 21, 1994. [retrieved on Dec. 18, 2008]. Retrieved from the Internet.
Latanya Sweeney, Towards a Privacy-Preserving Watchlist Solution. AAAI Spring Symposium, AI Technologies for Homeland Security, 2005, 1 page.

\* cited by examiner

IDENTIFICATION VERIFICATION SYSTEM

CROSS REFERENCE TO RELATED APPLICATIONS

This application is a continuation of U.S. patent application Ser. No. 15/005,253, filed on Jan. 25, 2016 which is a continuation of U.S. patent application Ser. No. 14/011,166, filed Aug. 27, 2013, now U.S. Pat. No. 9,245,157, issued on Jan. 26, 2016, which is a continuation of U.S. patent application Ser. No. 13/334,184, filed Dec. 22, 2011, now U.S. Pat. No. 8,517,254, issued on Aug. 27, 2013, which is a continuation of U.S. patent application Ser. No. 12/769,606, filed on Apr. 28, 2010, now U.S. Pat. No. 8,083,130, issued on Dec. 27, 2011, which is a continuation of U.S. patent application Ser. No. 10/440,058, filed on May 16, 2003, now U.S. Pat. No. 7,708,189, issued on May 4, 2010, which claims priority to U.S. Provisional Application No. 60/381,361, filed on May 17, 2002, all of which are incorporated by reference herein in their entireties.

FIELD OF THE INVENTION

This invention relates to the field of identification systems. In particular, this invention is drawn to a system and method for real-time identification verification.

BACKGROUND OF THE INVENTION

A typical identification (ID) card includes information about the cardholder such as name, address, a physical description, and picture. Most ID cards also contain some sort of machine-readable identifier such as a magnetic stripe, a bar-code, a smart chip, etc. ID cards are typically used to restrict access to areas or products to unauthorized cardholders. For example, laws in every state require a person to be at least a minimum age to purchase alcohol or tobacco products. Similarly, in most states, a patron must be at least a minimum age to enter a bar. Typically, to verify that a person meets age requirements, the person must present an ID card prior to purchasing products or prior to being admitted to an establishment having age requirements.

There are numerous problems with using ID cards for the purposes mentioned above. One problem relates to fake or altered ID cards. It is very common for under age people to obtain fake or altered ID cards that show that the cardholder meets a minimum age requirement. In addition, it is common for under age people to use a valid ID card belonging to someone else. The quality of many fake or altered ID cards is such that it is extremely difficult to distinguish or determine the validity of an ID card.

Another problem relating to ID cards is that it is cumbersome to verify their authenticity. For example, when a law-enforcement officer verifies the validity of an ID card, the officer typically gets on a radio and reads the ID number to a remote person who has the ability to verify the validity of the ID. This procedure is labor intensive and time-consuming for the officer.

There is therefore a need for a system that quickly and easily verifies the validity of ID cards.

SUMMARY OF THE INVENTION

An apparatus of the invention is provided for verifying the validity of ID cards comprising: a web-enabled cellular telephone; a magnetic stripe reader connected to the cellular telephone for reading ID numbers from ID cards; and software installed in the cellular phone to facilitate the transmission of ID numbers to a remote database and the reception and display of information relating to the transmitted ID numbers.

Another embodiment of the invention provides an apparatus for verifying the validity of ID cards comprising: an ID card input device for receiving an ID number from an ID card; a wireless transceiver for transmitting a messages to a remote database and receiving replies from the remote database; and a display for displaying information relating to the replies.

Another embodiment of the invention provides a method of verifying the validity of ID cards comprising the steps of: providing a card reading device; providing a remote database containing ID information; reading an ID card using the card reading device; sending a message to the remote database; querying the database for a match to the read ID card; and in response to the message, sending a reply message back to the card reading device, wherein the reply message contains information about the read ID card.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In general, the present invention provides a real-time identification verification system and method that can be used to verify the validity of an ID, as well as help to verify that the ID belongs to the ID holder. The present invention has various optional features, as well as various uses, examples of which are described below.

Figure 1:
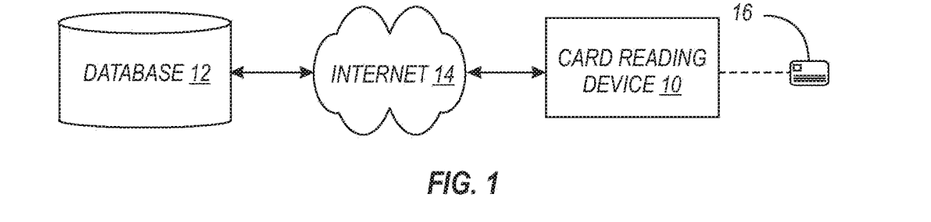
FIG. 1 is a block diagram illustrating one example of an environment in which the present invention may be used.

The present invention may be used in numerous environments. FIG. 1 is a block diagram illustrating one example of an environment in which the present invention may be used. FIG. 1 shows an ID card reading device 10 that is in communication with a database 12 via the Internet 14 or some other manner (e.g., phone lines, etc.). The card reading device 10 may communicate with the database 12 wirelessly (e.g., via a cellular network, WiFi (802.11b), radio, etc.), over a network, or in any other desired way. The ID card 16 shown in FIG. 1 may include at least one of the following: an ID number, a PIN number, a magnetic stripe, a smart chip, a bar code (1-dimensional, 2-dimensional, etc.) and/or a photograph. The ID card reading device 10 is capable of reading (via a magnetic stripe reader, bar-code scanner, smart card reader, text recognition system, voice recognition system, optical card reader system, keypad for manual entry, querty keyboard, and/or any other desired device) the ID card 16 presented by an ID holder.

Figure 2:
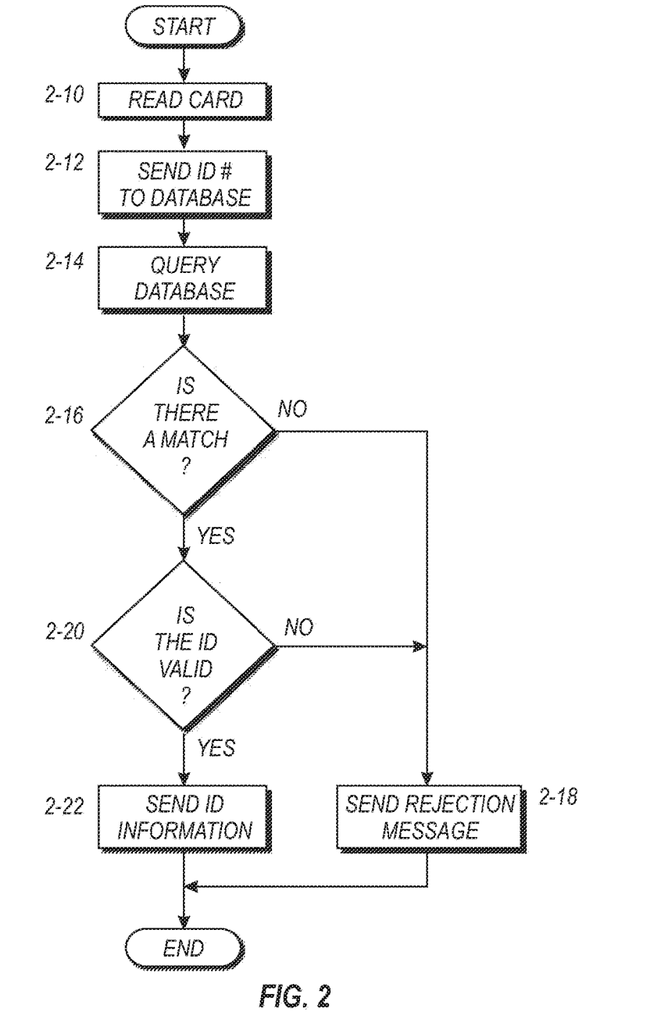
FIG. 2 is a flowchart illustrating one example of the use of the invention.

The present invention has many uses. Following is one example of a use of the identification verification system of the present invention. FIG. 2 is a flowchart illustrating an example of the use of the invention. One example of when the process illustrated in FIG. 2 would be used is when an ID holder desires to enter an establishment or purchase a product that has age restrictions. The process begins at step 2-10 where the ID card reading device 10 reads the ID card. Next, at step 2-12, the device sends an ID number (or other read information) to the database 12 of a service provider. Next, at step 2-14, the database 12 is then queried. At step 2-16, the process determines whether a match was found. If there is no match in the database, then a rejection message is sent back to the device at step 2-18. If a match was found, the process proceeds to step 2-20, where the process determines whether the ID is valid. If the ID is not valid, then a rejection message is sent back to the device at step 2-18. For a valid ID, the service provider responds to the request at step 2-22 by sending back ID information to the device 10. The ID information sent back to the ID reading device 10 may include any desired information, such as a valid/invalid message, a name, an address, a photo, a physical description of the ID holder, etc.

In one example, biometric information is stored on an ID card. Prior to reading an ID card, biometric information from an ID card holder is compared with the biometric information stored on the ID card to verify that a person presenting an ID card matches the biometric information stored on the ID card. Once a match is made, the process described above continues (e.g., beginning with step 2-10 in FIG. 2).

If desired, the card reading device can selectively display or store various information. For example, a listing of the IDs read during a particular time period can be read. Also, if desired, the card reading device can provide a listing of patrons in an establishment which can be used for things such as running promotions, marketing, building customer databases, etc. Similarly, data can be stored at the database for similar uses.

In one example, the present invention provides a web-enabled database system as a tool to combat ID fraud and underage use of alcohol and tobacco. The invention enables bars, restaurants, package stores, convenience stores and all other retailers of alcohol and tobacco products, as permitted users of this type of restricted data, to verify the age of an individual and the validity of a state drivers license or ID card presented as proof of age and/or identification.

In one example of the database of the present invention, the database contains all current state drivers licenses and identification cards, obtained from state departments (e.g., in Texas, from the Texas Department of Public Safety (DPS)). The database may include data from multiple states, or from a national database. The database is loaded onto servers linked to the Internet. The database may be updated as frequently as desired, or as frequently as the data is available from states. In addition, the database may contain state license/permit information that entities must have to sell liquor, tobacco, etc. For example, for a database in Texas, the database may contain all Texas Alcoholic Beverage Commission ("TABC") license/permit information ("TABC Permit Number") available from TABC. A web site may be provided on the Internet, allowing permitted users to have encrypted access to the database.

Figure 3:
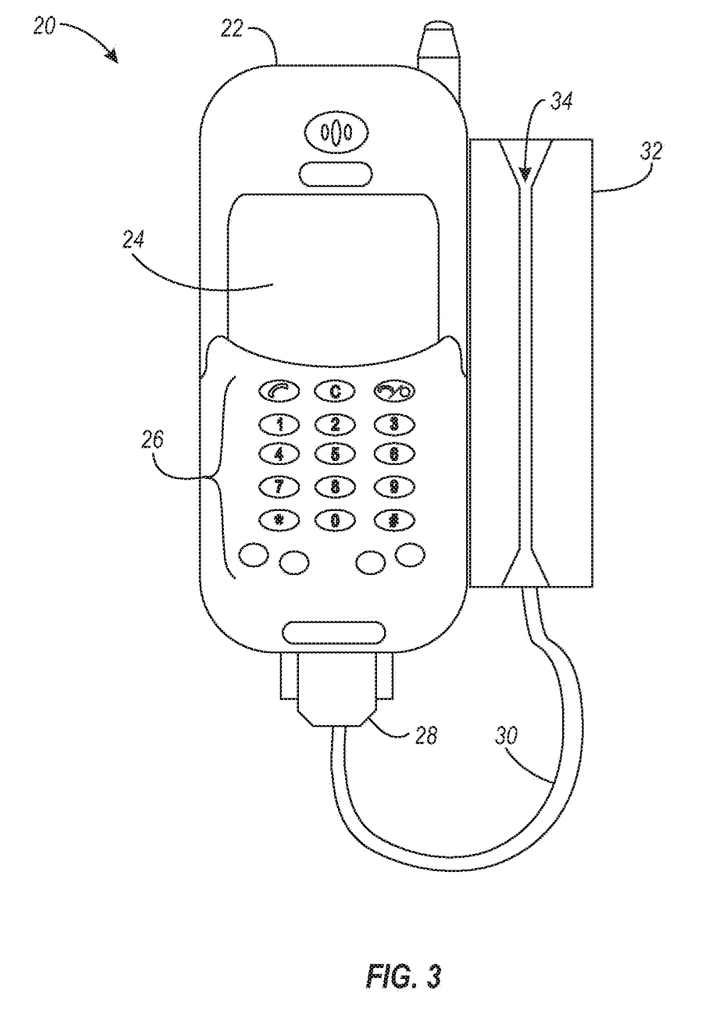
FIG. 3 is a view of one example of a card reading device of the present invention.

A licensed establishment ("customer"), as a permitted user of the invention for verification purposes, could use the invention (e.g., as illustrated in FIG. 2) to check both the age of an ID holder and the validity of an ID when an individual presents the ID to the customer (by typing in the Drivers License or ID number, or by scanning the information from the card with a machine-readable device). The customer will be able to choose the input device from a range of equipment, including, but not limited to, computers, PDA's, wireless devices including cell phones, networked cash registers, etc. In one embodiment, the chosen equipment includes a web-enabled browser. One suitable input device is comprised of a combination 3G cell phone/PDA that receives an ID identification number (from a card reading device or from a manual entry) and generates the appropriate requests to be sent to the service provider. FIG. 3 is a view of one example of a card reading device 20 of the present invention. FIG. 3 shows a PDA cell phone 22 (such as a Kyocera model 6035 PDA phone). Of course, other devices may also be used, such as Palm Pilots, Compaq IPAC's, or a Blackberry, etc. The cell phone 22 may include voice capabilities, but such capabilities are not required. The PDA cell phone 22 includes conventional features such as a display 24, keypad 26, processor, transceiver (not shown), etc. Attached to the phone (via connector 28 and cord 30) is a magnetic stripe reading device 32 which is capable of reading the magnetic stripe on an ID card when the card is swiped through the slot 34. The embodiment shown in FIG. 3 provides one example of a real-time wireless ID verification device. In some configurations, the magnetic stripe reading device may be integrated into the cell phone/PDA case itself. Thus no wires will be visible or present.

The functions of the card reading device are implemented using software applications. For example, in the example of the PDA 3G phone, Java applications can be stored in the phone to execute the necessary functions. Of course, many desired computer languages can be used (e.g., C++ for Microsoft platforms).

In addition to, or in place of the display 24, the card reading device can use other user perceivable devices to convey received information to a user. In one example, one or more lights can be provided to convey certain information. For example, when an ID is invalid or a person is underage, a red light could be activated. Similarly, when an ID is valid and/or a person is not underage, a green light could be activated. In another example, a speaker or headphone jack can be used to provide audio information to a user.

In this example, the device may also include recorded speech or a text to speech processor to generate verbal messages (e.g., "ID valid", "ID not valid", "underage", "legal age", "arrest warrant outstanding", "error reading ID", "re-enter ID", etc.) to a user, which would allow a user to receive information without having to read a display. In another example, an infrared signal could be sent to a printing device and a ticket or authorization card could be given to a patron or a visitor.

Referring back to the example above, after a patron's ID is entered, the device will transmit the ID number to the database server of a service provider. The server will then compare the ID number to the driver's license and ID database. If the ID number is invalid, that information will be returned to the customer's device for display to the customer. If the ID is valid, the server will return to the customer's device, the patron's name, birth date, calculated age and, if available in the database, the patron's physical description or photograph as stored in the database. The customer can then compare that information to the presented ID and also to the presenter, to be certain that the person presenting the ID is the person whose description appears on the ID.

In one example, when the server receives the information, a record is inserted into the database archive, including the permit number, the drivers license or ID number, and a date and timestamp. This information is available to the customer to answer inquiries made by state authorities relating to an infraction of a rule or law. Any desired information relating to the transaction can be saved in the database. In one example, no information is saved other than that created by the timestamp procedure, and that information is erased from the database if not used within the time period specified by state or federal law or the state alcoholic beverage commission for its statute of limitations for infractions (in one example, six months) after it is saved. This feature of the invention has numerous applications. For example, a customer can use the stored information to help reduce liability in the event that the customer is accused of some infraction of the law relating to the sale or alcohol or tobacco (i.e., the invention can be used to verify performance of age-compliance checks). In another example, a customer may be able to use the fact that the information is archived to reduce the cost of liability insurance ("Dram Shop" insurance). In another example, the timestamped information that is stored can be cross-referenced with timestamped video surveillance records in case the customer or law enforcement officials later need to determine who actually presented a particular ID.

Another optional feature of the invention relates to sponsorship of ID verification devices. Sponsors who desire to be associated with the effort to curb underage drinking and smoking can be invited to contribute to help defray the customer's device cost and to provide promotional documentation to potential customers. Sponsors can be credited individually (e.g., on the web site, etc.) for their participation in the effort to combat underage drinking and smoking. In addition, sponsors will be able to use their participation in the program for advertising as well as promotional activities.

The present invention may be implemented in numerous way, but following is one example of implementation of the invention using a registration process. A registration process may be included on the service provider's web site. Following is an example of an exemplary registration process that may be provided. To register, a customer can provide the customer's assigned license number, credit card information for billing purposes, and a signed Certificate of Permitted Use of the data (where access to data in the database is restricted by law for approved users or purposes). The customer can print out, sign and fax back the Certificate of Permitted Use found on the website or request a Certificate be faxed or mailed to customer from the service provider. In either case, the customer registration will not be complete, and the customer will be denied access to the data, until the signed Certificate reaches the service provider. The customer may be charged a one-time setup fee and an annual license fee. Thereafter, the customer may be charged a monthly amount for usage based upon volume.

Following is another example of the use of the present invention. In the example, a central site is established which contains email and database servers. The central site is located in a secure facility, with adequate power and server redundancy. In fact, the secure facility may be sufficient to meet FBI and/or INTERPOL requirements for a secure, encrypted environment. A customer registers for the service and obtains from the service provider, or another source, a card reading device (for example, a Kyocera 6035 mobile phone, a Motorola i88s, or a RIM/Blackberry, etc.) which will read, transmit and receive back the ID information. When a patron enters the customer's establishment (bar, restaurant, convenience store, grocery store, etc.), and the establishment checks that person's ID, the drivers license or ID number is entered into the device. In this example, the card reading device is already loaded with the customer's permit number for the customer's location. The permit number and the read license number are transmitted to the central site email server over a wireless telephone network (for example, a cellular network) using a Short Messaging System (SMS) message. The central site email server is continually polled for incoming messages. When received, the received message is parsed for data. The license or ID number in the message is then matched to the database. If a match is not found, an appropriate rejection message is sent back to the sending device. If a match is found, a reply is sent to the sending device, including, for example, license number, name, birth date, calculated age, and if available and authorized by law, the cardholder's physical characteristics, including race, height, weight, hair color and eye color, and/or arrest warrant information. After transmission, the database archive is updated with permit number (to identify customer's establishment), drivers license or ID number, date and time of the ID check, and all other desired data transmitted to customer's sending device. If required by law, archived data will be derived from the service provider's database, except perhaps the customer's Permit Number, which will be recorded from the data sent by the sending device.

This age-verification and anti-fraud tool of the present invention is available for use by all establishments which have a need to verify a patron's age or the validity of a drivers license or ID offered by the patron as identification.

In another example, the card reading device can include a fingerprint reader for reading the ID presenter's fingerprint. If an ID stores a fingerprint, the scanned fingerprint can be compared to the fingerprint on the ID. Similarly, if the service provider sends back fingerprint information, the device can compare the fingerprint stored in the database with the scanned fingerprint to ensure that the ID presenter is the person identified on the ID. In one example, a person presents an ID card with his/her fingerprint (or other biometric) template stored on the card. A device attached to the card reader or a separate device is used to verify the card template to the live fingerprint/biometric. If a match is positive, the device is then used to verify remote database information, and retrieve personal information or a photograph or information about what the person is allowed to do, i.e., load baggage into an airplane cargo hold.

The present invention may be used for various applications in addition to what has been described above. For example, law enforcement officers could use the invention to get drivers license information without being in a squad car, or having to tell an operator the ID number over the radio, and INS officers could use the device at border crossings to check the validity of INS ID's issued to legal aliens who cross and recross the border. In another example, movie theaters could use the present invention to verify whether someone is old enough to see a restricted move. Similarly, universities and colleges can use the invention to verify student IDs. Also, private entities, such as warehouse clubs, could use the invention to verify memberships, using a private database.

In another example, Homeland Security could verify the validity of a United States visa or visitor's card, etc. and determine the expiration date and/or compare the expiration date of a visa or permit to the expiration date of a valid US driver's license issued in the same name. The device could also compare the visa holder's permanent address with the address presented on the driver's license.

The device can be used to uniquely identify each magnetic stripe card using, for example, a technology such as Magneprint, developed by MAGTEK. This property of every magnetic stripe card servers as a unique identifier for each card. The Magneprint is sent to the card issuer so that the card can be validated as the authentic original card. Following this verification, the device can then access the relevant database in the manner described above.

As mentioned, the present invention can be used for numerous applications. In addition to the examples mentioned above, the present invention can be used by airport security personnel, law enforcement officials, private clubs, schools, etc.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A system comprising:
   a wireless handheld device that includes at least a display, a processor, and a transceiver;
   a card reader having a connector to connect to an external port of the wireless handheld device for reading an ID card to obtain at least some cardholder information; and
   software to facilitate operations at least partly using the processor, the operations including at least:
      reading the ID card using the card reader to obtain the at least some cardholder information;
      wirelessly transmitting using the transceiver the at least some cardholder information to query a remote database of a service provider to verify a validity of the ID card based at least partly on the at least some cardholder information, at least partly in response to reading the ID card using the card reader;
      wirelessly receiving via the transceiver verification information relating to the ID card, at least partly in response to the query of the remote database of the service provider; and
      outputting via the display of the wireless handheld device at least one message associated with the verification information.

2. The system of claim 1, wherein the at least one message relates to the validity of the ID card.

3. The system of claim 1, wherein the card reader is comprised of a magnetic stripe reader or a bar code scanner.

4. The system of claim 1, wherein the card reader is comprised of a smart card reader.

5. The system of claim 1, wherein the card reader is comprised of an optical card reader.

6. The system of claim 1, wherein the wireless handheld device is at least one of a cellular telephone or a digital assistant.

7. The system of claim 1, wherein the at least some cardholder information includes at least one of an ID card number, a name, an address, a physical description, a picture, or an age.

8. The system of claim 1, wherein the verification information includes at least one of an age or physical description of an ID card holder.

9. The system of claim 1, wherein the connector is configured to removably connect to the external port of the wireless handheld device.

10. The system of claim 1, wherein the card reader is configured to perform text recognition.

11. The system of claim 1, wherein the service provider determines whether the at least some cardholder information matches a database record and responds with at least some of the following information: valid message, invalid message, name, address, photo, or physical description.

12. The system of claim 1, further comprising:
   a biometric reader configured to read biometric information of an ID card holder.

13. The system of claim 1, wherein the software is further configured to facilitate an operation comprising:
   wirelessly transmitting to the service provider using the transceiver at least some biometric information in association with the at least some cardholder information to verify identity of a person presenting the ID card.

14. The system of claim 1, wherein the software is further configured to facilitate an operation comprising:
   verifying an identity of a person presenting the ID card by reading biometric information of the person and matching the biometric information with biometric data associated with the ID card.

15. The system of claim 1, wherein the software is further configured to facilitate an operation comprising:
   verifying an identity of a person presenting the ID card by obtaining biometric information from the service provider and matching the biometric information with scanned biometric data of the person.

16. The system of claim 1, wherein the ID card includes a smart chip and wherein the card reader is configured to read the smart chip to obtain the at least some cardholder information.

17. The system of claim 1, wherein the ID card includes one or more of a drivers license, company ID card, INS card, student ID, visa card, visitor card, card with biometric information, card with magnetic stripe, card with smart chip, or card with bar code.

18. The system of claim 1, wherein the verification information is used to facilitate a financial transaction.

19. A peripheral device comprising:
   a card reader configured to read an ID card to obtain at least some cardholder information;
   a connector associated with the card reader to removably connect the card reader to a web-enabled wireless phone device to enable the web-enabled wireless phone device to
      (i) read the ID card using the card reader,
      (ii) obtain the at least some cardholder information in response to reading the ID card, and
      (ii) query a remote database of a service provider to validate the ID card.

20. A wireless handheld device comprising:
   a display,
   a processor,
   a transceiver;
   an integrated card reader for reading an ID card to obtain at least some cardholder information; and
   software configuring the processor to execute operations including at least:
      reading the ID card using the card reader to obtain the at least some cardholder information;
      wirelessly transmitting using the transceiver the at least some cardholder information to query a remote database of a service provider to verify a validity of the ID card based at least partly on the at least some cardholder information;
      wirelessly receiving via the transceiver verification information relating to the ID card at least partly in response to the query of the remote database of the service provider; and outputting via the display at least one message associated with the verification information.

\* \* \* \* \*